(12) United States Patent
Shin et al.

(10) Patent No.: US 8,381,227 B2
(45) Date of Patent: Feb. 19, 2013

(54) SYSTEM AND METHOD OF INTER-CONNECTION BETWEEN COMPONENTS USING SOFTWARE BUS

(75) Inventors: Young Sam Shin, Yongin-si (KR); Seung Won Lee, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 892 days.

(21) Appl. No.: 12/453,514

(22) Filed: May 13, 2009

(65) Prior Publication Data

US 2010/0146168 A1 Jun. 10, 2010

(30) Foreign Application Priority Data

Dec. 9, 2008 (KR) ........................ 10-2008-0124715

(51) Int. Cl.
*G06F 9/54* (2006.01)
(52) U.S. Cl. ....................................................... 719/313
(58) Field of Classification Search .................. 719/312, 719/313
See application file for complete search history.

(56) References Cited

U.S. PATENT DOCUMENTS

| | | | |
|---|---|---|---|
| 2006/0200515 A1* | 9/2006 | Cousins et al. ............... | 709/201 |
| 2006/0200567 A1* | 9/2006 | Cousins et al. ............... | 709/227 |
| 2006/0206525 A1* | 9/2006 | Cousins et al. ............ | 707/104.1 |
| 2007/0255718 A1* | 11/2007 | Baikov et al. ................... | 707/10 |

OTHER PUBLICATIONS

Schreiner, D.; Goshchka, K.M., "A Component Model for the AUTOSAR Virtual Function Bus," (Jul. 24-27, 2007) 31 Annual International Computer Software and Applications Conference, pp. 635-641 [retrieved from http://ieeexplore.ieee.org/stamp/stamp.jsp?tp=&arnumber=4291189&isnumber=4291085].*

Schreiner, D.; Goshchka, K.M., "Explicit Connectors in Component Based Software Engineering for Distributed Embedded Systems," (Jan. 20-26, 2007), Proceedings of the 33$^{rd}$ Conference on Current Trends in Theory and Practice of Computer Science, pp. 923-934 [retrieved from http://www.springerlink.com/content/mv52081367526135/fulltext.pdf].*

Bálek, D., "Connectors in Software Architectures" (2002), pp. 1-106 [retrieved from http://web.cs.mun.ca/~ulf/lit/arp/balek02connectors.pdf].*

Schreiner, D.; Karl M., "Modeling component based embedded systems applications with explicit connectors in UML 2.0," In Proceedings of the 2007 ACM Symposium on Applied Computing (SAC '07). ACM, New York, NY, USA, pp. 1494-1495 [retrieved from http://dl.acm.org/citation.cfm?id=1244321].*

AutoSar, "Technical Overview V2.0.1" (Jun. 27, 2006), pp. 1-43 [retrieved from http://www.autosar.org/download/R2.0/AUTOSAR_TechnicalOverview.pdf].*

* cited by examiner

*Primary Examiner* — S. Sough
*Assistant Examiner* — Brian Wathen
(74) *Attorney, Agent, or Firm* — Staas & Halsey LLP

(57) ABSTRACT

A method for inter-connection between components using a software bus, which may analyze whether a port in which at least one component is connected with each other is a data transmission port or a function interface calling port in accordance with an application of the port, determine an execution attribute of the port based on an analyzed result, and control the port in accordance with the execution attribute of the port. The function interface calling port may be divided into any one of a thread generation-connection port for each request using an attribute of an on-demand function calling port, or a recursive server connection port using an attribute of an on load function calling port in accordance with a type of the called port.

20 Claims, 12 Drawing Sheets

FIG. 3

| CLASSIFICATION | PROPERTIES |
|---|---|
| SENDER/RECEIVER | -PORT NAME<br>-MESSAGE TYPE : NORMAL / SCALAR<br>-TYPE: BLOCKING / NON-BLOCKING |
| REQUIRING PORT/PROVIDING PORT | -PORT / INTERFACE NAME<br>-ARGUMENT LIST / RETURN TYPE<br>-TYPE: SYNCHRONOUS / ASYNCHRONOUS [REQUIRE]<br>THREAD SAFE / THREAD UNSAFE |

(a) ON-DEMAND FUNCTION CALLING PORT (b) ON-LOAD FUNCTION CALLING PORT

SYSTEM AND METHOD OF INTER-CONNECTION BETWEEN COMPONENTS USING SOFTWARE BUS

CROSS-REFERENCE TO RELATED APPLICATIONS

This application claims the benefit of Korean Patent Application No. 10-2008-124715, filed on Dec. 9, 2008, in the Korean Intellectual Property Office, the disclosure of which is incorporated herein by reference.

BACKGROUND

1. Field

One or more embodiments of the following description relate to a system and method for inter-connection between components, in which components may be connected with each other using a software bus of a virtual bus structure, and a dynamic reconfiguration function being adaptable to a computing environmental change may be provided using provided connection attribute information.

2. Description of the Related Art

As software of an embedded system is recently becoming complex, and a reuse property of the software for productivity improvement is emphasized, studies for a component model for the embedded system have been actively made. In particular, the studies thereof have been actively made when a concept of the component is established and there are difficulties due to complexity of the software.

In a concept of a conventional component, a recycling property of the component may be improved and facilitation of a design may be provided, however, many limitations may be created when adapting a variety of connection attributes of components required in the embedded system, when adapting a dynamic reconstruction of the component according to the connection attributes thereof, and when adapting a multi-core computing environment.

Also, a component technique may include a component model and a run-time environment, and the component model may define an interface of the component and a composition method of the components.

In this manner, a component run-time environment may provide a runtime execution environment (RTE) where the component is arranged and performed, however, the runtime execution environment may cause much resource waste when applied in the embedded system where resource limitations are severe.

SUMMARY

According to one or more embodiments, there may be provided a system of inter-connection between components using a software bus, the system including a port analyzing unit to analyze whether a port in which at least one component is connected, with the at least one component being connected with each other, is a data transmission port or a function interface calling port in accordance with an application of the port, an execution attribute-determination unit to determine an execution attribute of the port based on the analysis result of the port analyzing unit, and a port controller to control the port in accordance with the execution attribute of the port.

In this instance, the execution attribute-determination unit may divide the function interface calling port into any one of a thread generation-connection port for each request using an attribute of an on-demand function calling port, and a recursive server connection port using an attribute of an on load function calling port in accordance with a type of the called port.

Also, the port controller, in a case of the recursive server connection port, may determine a thread generated in the port as any one type of a boss unit and at least one worker unit to thereby control the function to be performed in parallel.

According to one or more embodiments, there may be also provided a method for inter-connection between components using a software bus, the method including analyzing whether a port in which at least one component is connected, with the at least one component being connected with each other, is a data transmission port or a function interface calling port in accordance with an application of the port, determining an execution attribute of the port based on a result of the analyzing, and controlling the port in accordance with the execution attribute of the port.

In this instance, the determining may divide the function interface calling port into any one of a thread generation-connection port for each request using an attribute of an on-demand function calling port, and a recursive server connection port using an attribute of an on load function calling port in accordance with a type of the called port.

Also, the controlling, in a case of the recursive server connection port, may determine a thread generated in the port as any one type of a boss unit and at least one worker unit to thereby control the function to be performed in parallel.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of embodiments, taken in conjunction with the accompanying drawings of which:

FIG. 3 illustrates an example of a type and an attribute of a port interface according to one or more embodiments;

DETAILED DESCRIPTION

Figure 1:
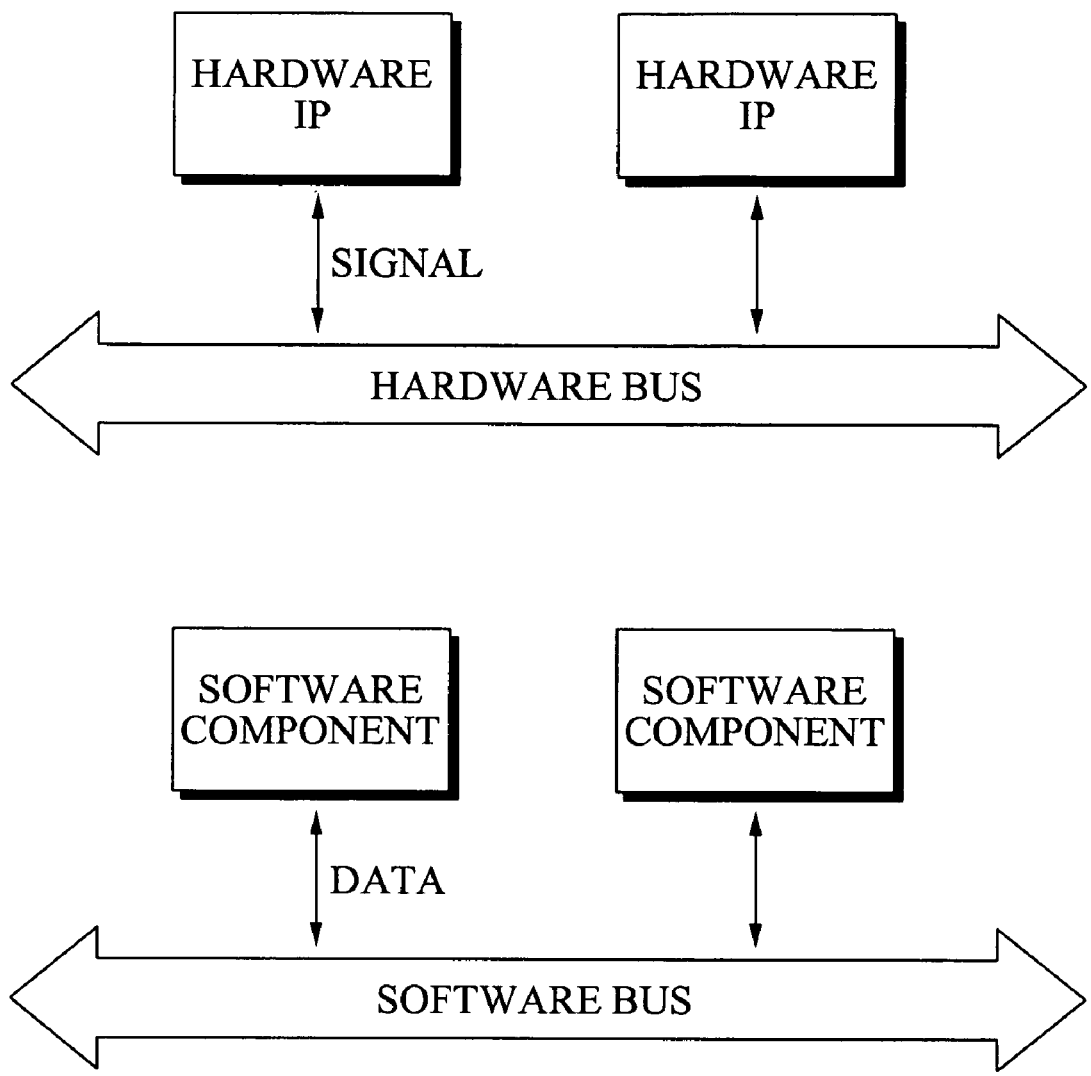
FIG. 1 illustrates a comparative example between a software bus and a hardware bus according to one or more embodiments.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Detailed descriptions related to a well-known related function or configuration will be omitted herein. Also, terms used throughout the present specification are used to appropriately describe one or more embodiments of the present invention, and thus may be different depending upon a user and an operator's intention, or practices of application fields of the present invention. Therefore, the terms must be defined based on descriptions made through the present invention.

A software bus according to one or more embodiments may be obtained by applying a concept of a hardware bus to software, for example.

FIG. 1 illustrates a comparative example between a software bus and a hardware bus according to one or more embodiments.

As illustrated in FIG. 1, the software bus according to the present example may provide a channel through which software components perform communicate, as in the hardware bus providing a channel through which hardware integrated processors (IPs) communicate.

For example, in the software bus, a protocol used for communication between software components may be provided similar to the hardware integrated processor (IP) generating and receiving signals to conform to a protocol used for bus communication so as to communicate through the hardware bus.

Also, the software bus according to the present one or more embodiments may enable software components performing in a heterogeneous distribution environment to communicate transparently. Specifically, the software components in the heterogeneous distribution environment may perform in different processors, and may perform a communication through different networks.

A system for inter-connection between components using the above mentioned software bus will be herein described in detail.

Figure 2:
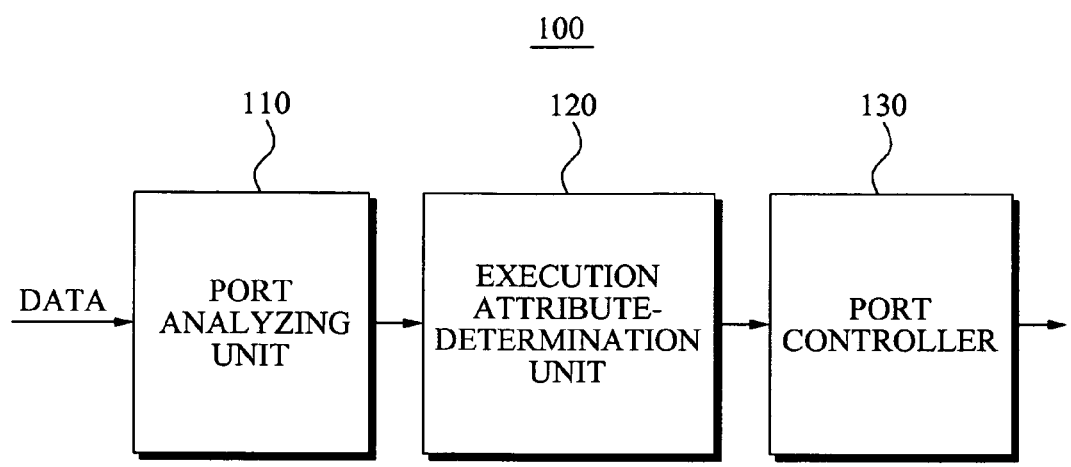
FIG. 2 illustrates a configuration of a system for inter-connection between components using a software bus according to one or more embodiments.

FIG. 2 illustrates a configuration of a system 100 of an inter-connection between components using a software bus according to one or more embodiments.

The system 100 according to the present one or more embodiments includes a port analyzing unit 110, an execution attribute-determination unit 120, and a port controller 130.

According to one or more embodiments, the port analyzing unit 110 may analyze whether a port in which at least one component is connected with each other is a data transmission port or a function interface calling port in accordance with an application of the port.

The execution attribute-determination unit 120 may determine an execution attribute of the port based on an analyzed result of the port analyzing unit.

The port controller 130 may control the port in accordance with the execution attribute of the port.

The port provided according to one or more embodiments may be a point of contact in which the port is connected with another component, and may be separated into a data transmission port or a function interface calling port depending on the application of the port, which will be described in detail with reference to FIG. 3.

FIG. 3 illustrates an example of a type and an attribute of a port interface according to one or more embodiments.

According to one or more embodiments, the data transmission port, as illustrated in FIG. 3, may be used in transmitting data between components as a connection port relation between a sender and a receiver.

In this instance, the data transmission port may transmit data to a port of the receiver by a code automatically generated through a function (sending function or receiving function) of the sender and receiver, regardless of the processor assignment of the component.

Also, the data transmission port may transmit the data in a normal message type or a scalar message type depending on the type of information or whether the data is blocked when the data is transmitted.

For example, in a normal message type, the data transmission port may transmit array data or data of a frame buffer, etc., and in a scalar message type, the data transmission port may transmit any one data type of byte, word, and long. The data transmission port may increase transmission efficiency in transmitting data of a significantly small unit.

In this instance, the component may include pointer information with respect to the function call. For example, the pointer may include a function pointer, a function list, a function factor information, etc., and the execution attribute-determination unit 120 (FIG. 2) may determine an execution attribute of the port using the pointer information.

Also, the function interface calling port according to one or more embodiments may be used when calling an interface between a requiring port of a client and a providing port of a server.

In this instance, the function interface calling port may automatically generate a code according to the processor assignment of the component as in the data transmission port, provide a calling scheme such as synchronous calling or asynchronous calling, and provide various calling schemes according to a calling by a thread.

Also, in a case of the function interface calling port, a suitable connection attribute may be required to be provided according to a called pattern and type, and a suitable port connection may be required to be provided according to the connection attribute, which are provided through a run-time environment of the software bus.

The system 100 (FIG. 2) according to one or more embodiments may determine the execution attribute of the port, and control the port according to the determined execution attribute, which will be described in detail with reference to FIG. 4.

Figure 4:
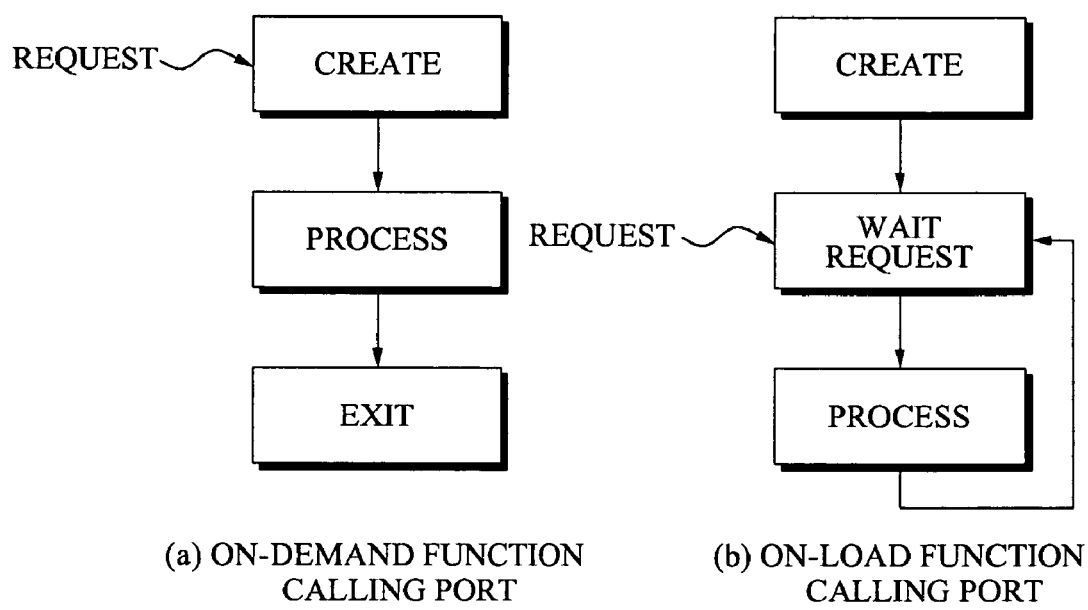
FIG. 4 illustrates an example of a function calling-execution model according to one or more embodiments.

FIG. 4 illustrates an example of a function calling-execution model according to one or more embodiments.

The execution attribute-determination unit 120 (FIG. 2) according to one or more embodiments, as further described in FIG. 4, may divide the function interface calling port into any one of a thread generation-connection port for each request using an attribute of an on-demand function calling port, and a recursive server connection port using an attribute of an on load function calling port in accordance with a type of the called port.

The port controller 130 (FIG. 2), in a case of the on-demand function calling port, may perform the called function in a thread generated when a calling event of the on-demand function calling port occurs. In this instance, the called function may be removed after terminating the called function.

Also, in a case of the on load function calling port, the port controller 130 may perform the called function in a thread generated when a calling of the on load function calling port is initially requested.

In this instance, the port controller 130 (FIG. 2) may enable the generated thread to remain during a life-cycle to thereby perform the called function in the remaining thread when a calling of the function occurs.

A function calling execution model attribute and runtime execution environment (RTE) according to the present one or more embodiments will be defined with reference to Table 1 below, for example.

TABLE 1

Example of component connection on software bus:

| Classification | Properties | | |
|---|---|---|---|
| Runnable entity | Entity name Type: concurrent/iterative | | |
| Runnable entity —(——●—— | Scheduling parameter: RR/FIFO/PFAIR Number of threads [concurrent]: on demand/on load | | |
| Type | | RTE in requiring port | RTE in providing port |
| Concurrent | On demand | Create task Call providing port interface | |
| | On load | Send request | Create worker tasks once Wait request Send request to idle task Call providing port interface when there is no idle task |
| Iterative | | Send request | Create task once Wait request Call providing port interface |

In Table 1, an executable entity with respect to the execution attribute of the function calling port and an RTE in accordance to the runnable entity are defined.

The port controller 130 (FIG. 2) according to one or more embodiments may provide any one of a synchronous attribute or an asynchronous attribute with respect to the port performing the called function, or provides any one of a thread safe attribute or a thread unsafe attribute.

In this instance, the port controller 130 (FIG. 2) may synchronize a port of the thread unsafe attribute with a port of the thread safe attribute according to the synchronous attribute when the thread safe attribute is requested from the port of the thread unsafe attribute.

Also, in a case of the recursive server connection port, the port controller 130 (FIG. 2) may determine a thread generated in the port as any one type of a boss unit and at least one worker unit to thereby control the function to be performed in parallel.

Also, the port controller 130 (FIG. 2) may transmit a calling request for the function to the at least one worker unit through the boss unit, and the at least one worker unit may perform the calling-request function and transmit a performance result to a port having performed the calling request for the function.

In this instance, the port controller 130 (FIG. 2) may control any one of an idle request, a process request, and a receiving block request of the at least one worker unit to be performed using the boss unit, thereby effectively distributing thread resources.

In general, the embedded system may suffer from significant resource limitations in terms of its characteristics, and thereby it may be difficult to reduce an overhead in the RTE in accordance with componentization. As a result, there may occur performance deterioration or supplementation of necessary memory resources in an RTE according to the componentization, and thus the RTE may be required in order to minimize this overhead.

Figure 5:
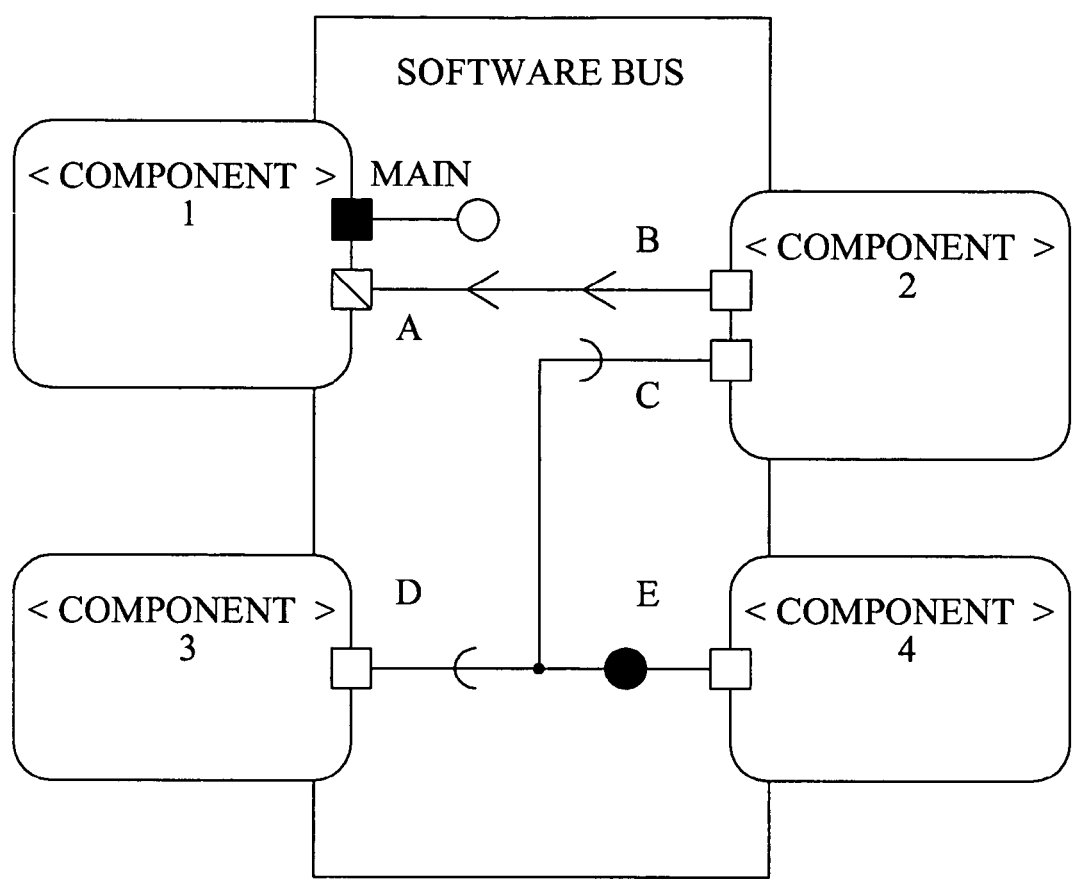
FIG. 5 illustrates an example in which components are connected with each other on a software bus according to one or more embodiments.

FIG. 5 illustrates an example in which components are connected with each other on a software bus according to one or more embodiments.

The system for inter-connection between components according to an example embodiment may define a port interface being suitable for an embedded RTE as illustrated in FIG. 5, and a connection for the interface may be virtually performed on a software bus at an abstraction level, and the connection may be actually performed when a performance code of the software bus, in a case of a static system, is automatically generated at system compile time (build time). In a case of a dynamic system, the software bus may provide an optimized performance model being adaptable to a change in a computing RTE by cooperating with a resource manager, thereby providing an optimized connection state.

Figure 6:
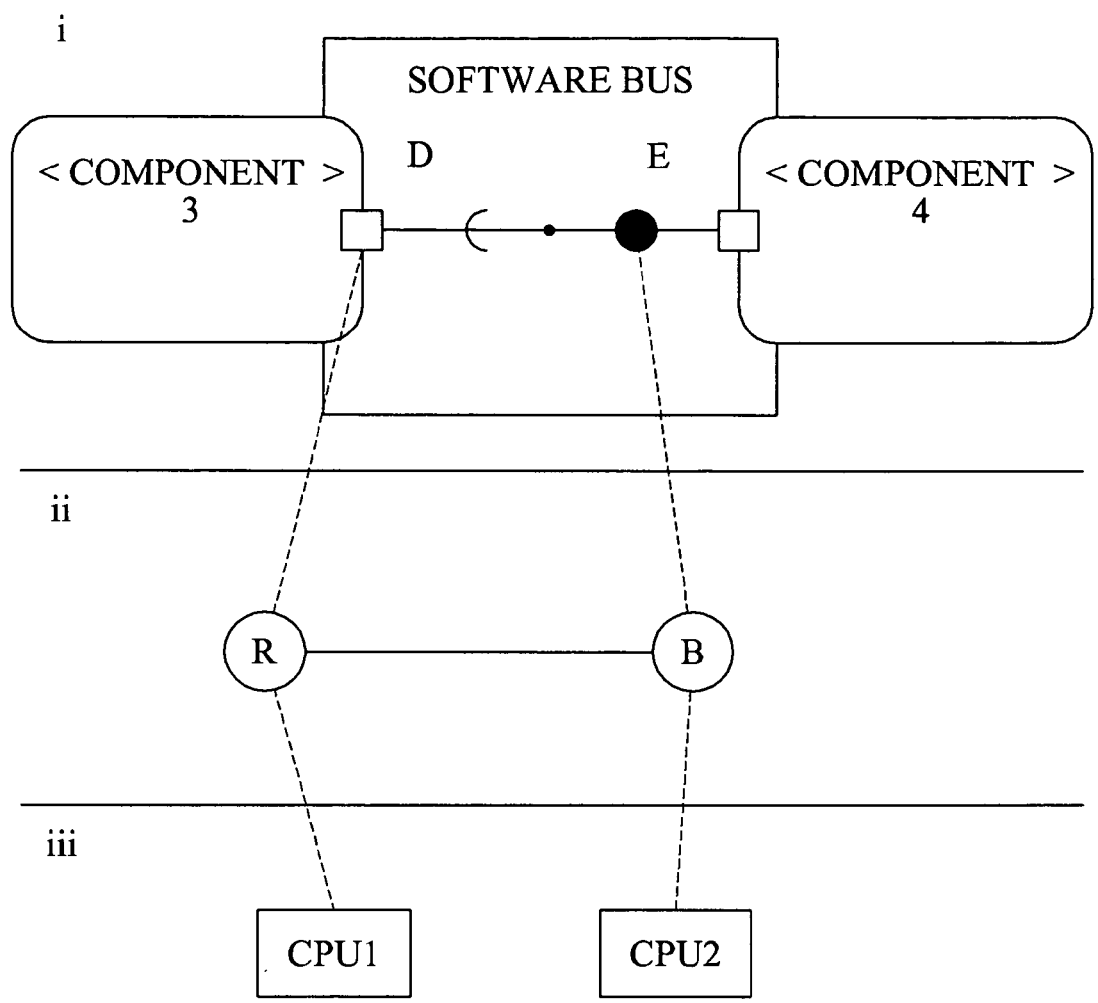
FIG. 6 illustrates an example of a performance model in a case where a number of on load functions specified in a thread function calling performance attribute is '1' according to one or more embodiments.
Figure 7:
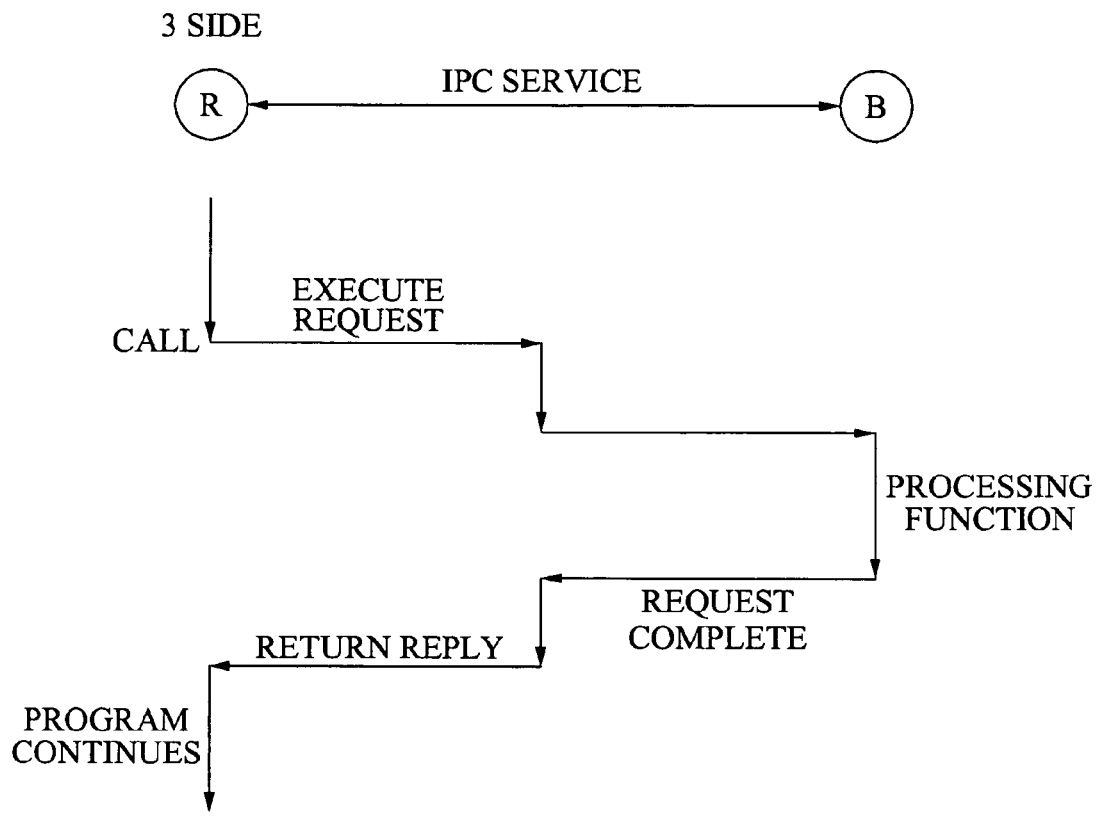
FIG. 7 illustrates a flowchart of a function call, for example, a function call with respect to FIG. 6.

FIG. 6 illustrates an example of a performance model in a case where a function call including a number of on load functions specified in a thread function calling performance attribute is '1' according to one or more embodiments, and FIG. 7 illustrates a flowchart of a function call, for example, the function call with respect to FIG. 6.

As described above, the system for inter-connection between components according to one or more embodiments may provide a software bus having the same structure as that illustrated in FIG. 6.

For example, the system in which the number of on load functions specified is '1' may transmit the received request signal to an instruction unit B through an Inter-Processor Communication (IPC) service when receiving a request signal from a requesting unit R as illustrated in FIG. 7, and the instruction unit B may process the request according to a called function.

Figure 8:
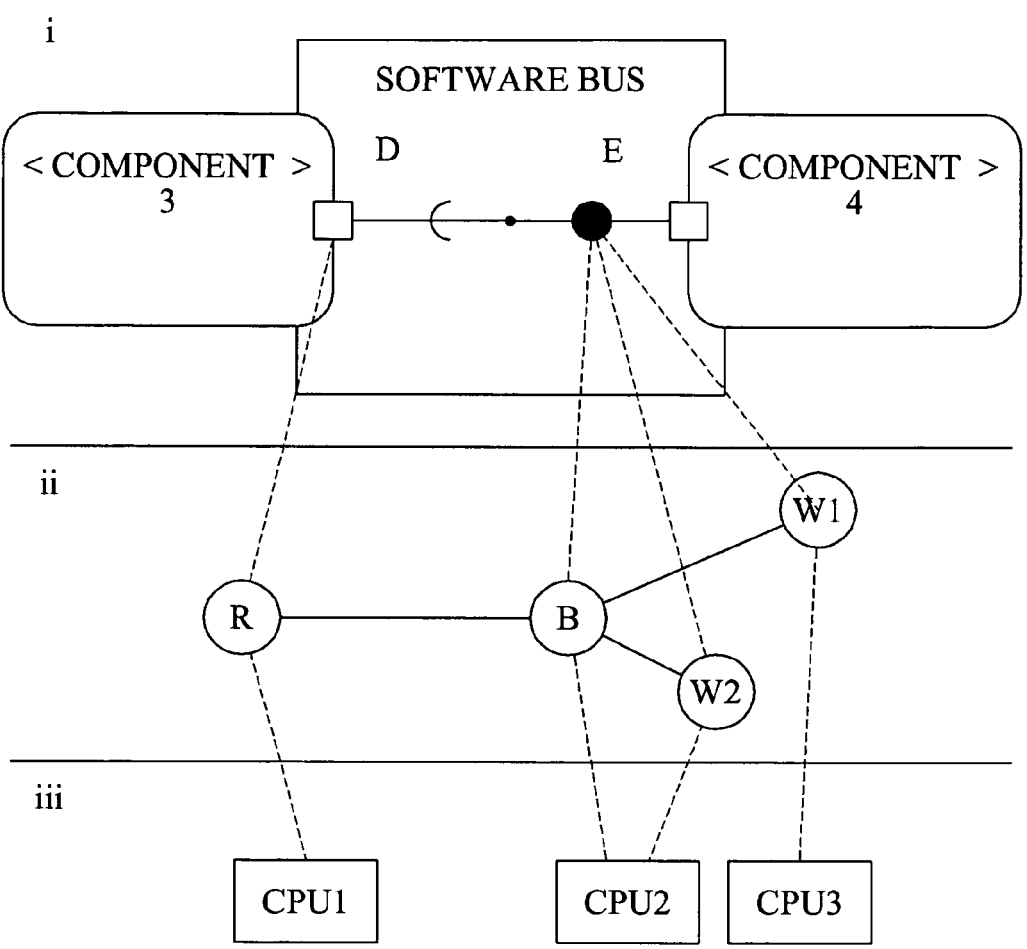
FIG. 8 illustrates an example of a performance model in a case where a number of on load functions specified in a thread function calling performance attribute is '3' according to one or more embodiments.
Figure 9:
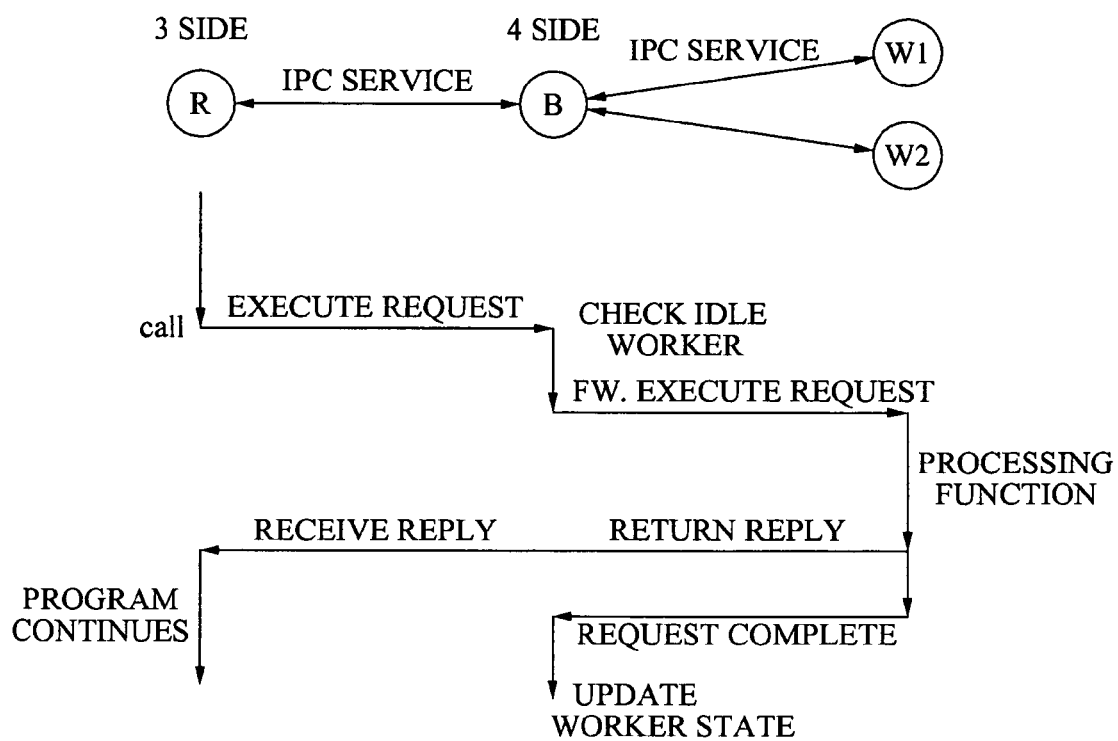
FIG. 9 illustrates a flowchart of a function call, for example, a function call with respect to FIG. 8.

FIG. 8 illustrates an example of a performance model in a case where a function call including a number of on load functions specified in a thread function calling performance attribute is '3' according to one or more embodiments, and FIG. 9 illustrates a flowchart of a function call, for example the function call with respect to FIG. 8.

Also, the system for inter-connection between components according to one or more embodiments may provide a software bus having a structure in which a multiple number of on load functions exist, as illustrated in FIG. 8.

For example, the system in which the number of on load functions specified is '3' may transmit the received request signal to the instruction unit B through the IPC service when receiving a request signal from the requesting unit R as illustrated in FIG. 9, and the instruction unit B may transmit a performance request according to the request signal to execution units (W1 and W2) to process the performance request according to a corresponding called function.

Also, according to the present one or more embodiments, even in a case where the number of on load functions specified is '3', a number of the execution units may be dynamically changed according to a change in the computing environment. For example, in an application decoding a standard definition (SD)-level image, a plurality of the execution units may be generated in the software bus so that a parallel property of a decoder is maximally utilized to cope with an increase in computing performance requests when a high definition (HD)-level image is required to be decoded as an input.

Figure 10:
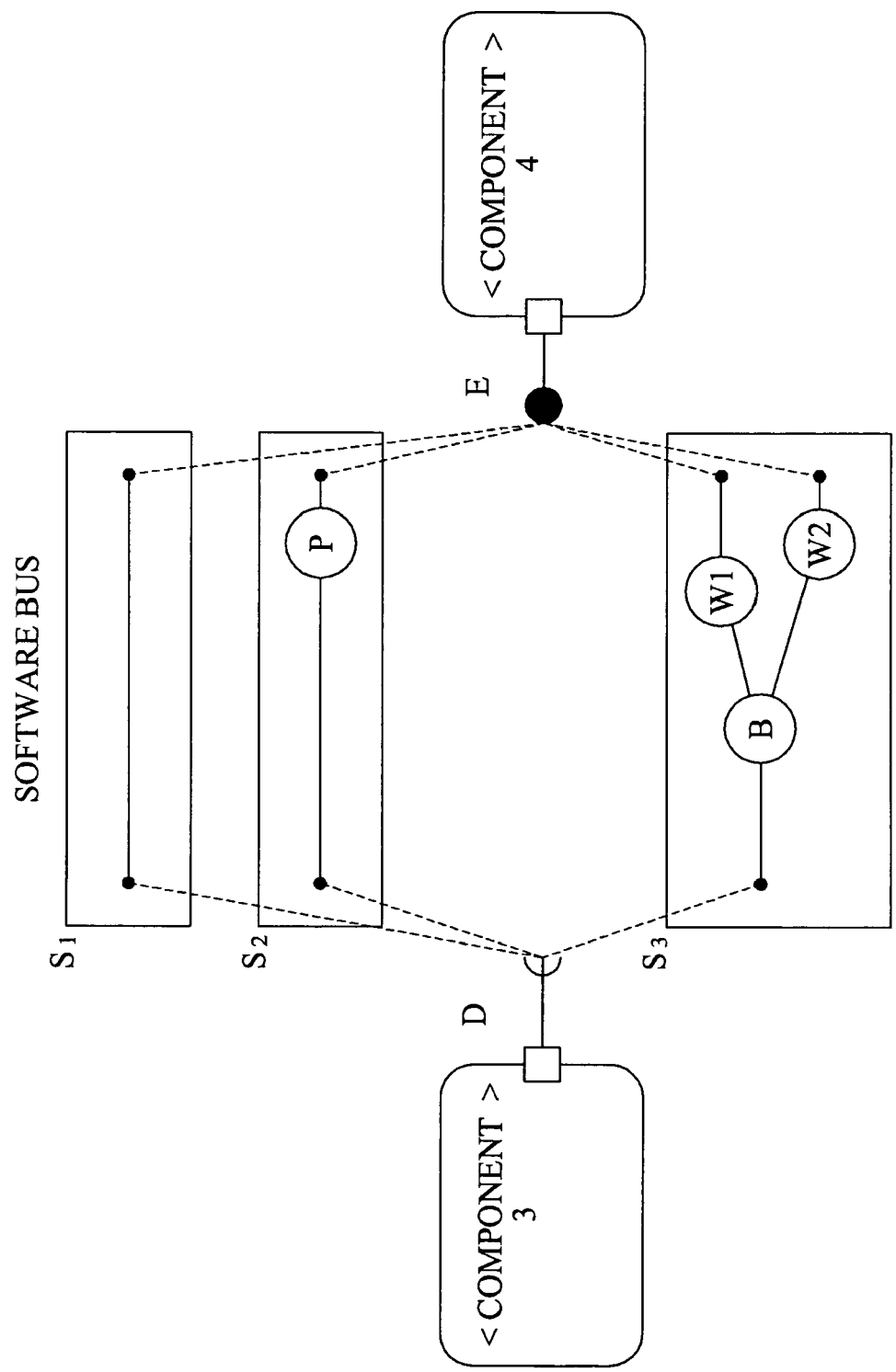
FIG. 10 illustrates an example of a structure in which identical components are connected with each other, and different components are connected with each other according to one or more embodiments.

FIG. 10 illustrates an example of a structure in which identical components are connected with each other, and different components are connected with each other according to one or more embodiments.

According to the present one or more embodiments, as illustrated in FIG. 10, another type of a performance model may be operated using the software bus.

For example, in the system 100 (FIG. 2), a component 3 and a component 4 include a requesting unit D and a providing unit P, respectively, and the requesting unit D and the providing unit P may be connected to the function interface calling port on a virtual software bus. In this instance, the software bus may include pointer information of the function interface calling port of the components 3 and 4, and provide a software bus in which provided performance attributes are reflected using the pointer information.

For example, in the system 100 (FIG. 2) of a case of $S_1$, the function interface calling port of the components 3 and 4 are directly connected with each other, so that a function call is performed while not passing through any routes. As a result, the system may be performed in the same manner that a function provided in the component 4 is directly performed in the component 3.

Also, in the system 100 (FIG. 2) of a case of $S_2$, a thread operation of a function provided in the component 4 is performed in the component 3, and the threaded function is called in the component 3. As a result, the system 100 (FIG. 2) may enable a function processing to be formed in a thread being independent from the component 3, and the thread and the function call may provide a synchronous attribute or an asynchronous attribute to thereby provide a method of increasing a parallel property.

Also, the system 100 (FIG. 1) of a case of $S_3$ may provide a performance model of the above-described instruction unit-execution unit type as the performance model providing the parallel property of the function call. Specifically, the port controller 130 (FIG. 2) may dynamically increase a number of the execution units (W1, W2, for example) when a number of the on load functions increases.

Figure 11:
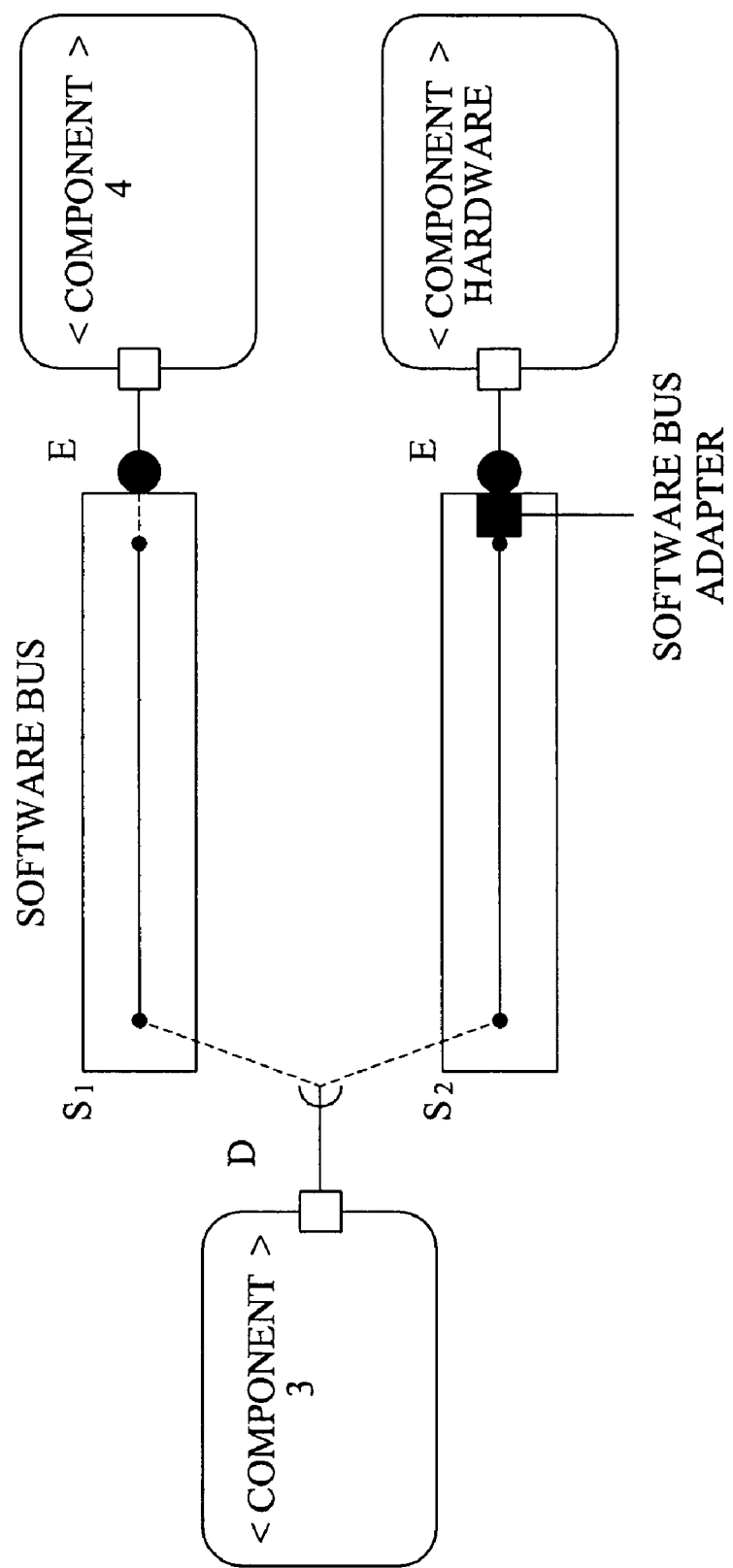
FIG. 11 illustrates a modified example of a software bus in a case where a component is modified according to one or more embodiments.

FIG. 11 illustrates a modified example of a software bus in a case where a component is modified according to one or more embodiments.

The system 100 (FIG. 2), in a case where the requesting unit is the software component and the providing unit is the hardware component, may connect a software adapter with the providing unit, whereby the providing unit may be connected with the requesting unit.

For example, in a case where the component 4 acting as the software component is replaced with the hardware component, the system 100 (FIG. 2) may supplement an adapter for connecting the software bus with the hardware component, so that the hardware component may function as the software bus, and a new hardware component 4 may be connected with the software bus through the adapter.

The replacement of components may be similarly performed even between the software components except that the adapter, for software components, is not needed.

Specifically, according to the present one or more embodiments, the above described function of the software bus in which components are freely connected with each other on a virtual bus in a design stage may be provided, thereby increasing efficiency in the design stage.

Also, according to the present one or more embodiments, a respective performance model may be dynamically replaced depending on a change in a computing environment in which a system designed based on the connection and performance attribute information designed in the performance stage is performed, thereby providing a dynamic reconstruction function, and a dynamic component RTE in such a manner that overhead in resources of the system is minimized.

Figure 12:
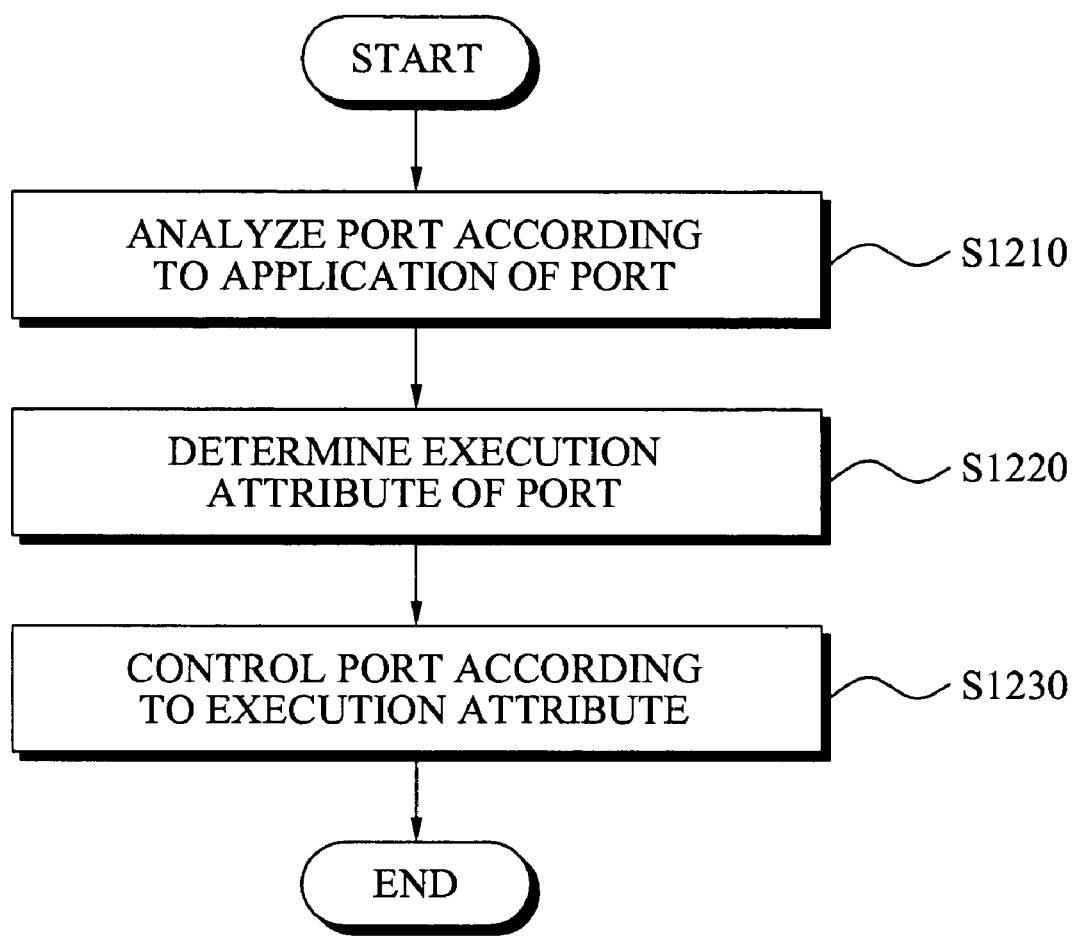
FIG. 12 illustrates a flowchart of a method of inter-connection between components using a software bus according to one or more embodiments.

Consequently, the system according to the present one or more embodiments may provide an improved method for inter-connection between components using the software bus as illustrated in FIG. 12.

FIG. 12 is a flowchart illustrating a method of inter-connection between components using a software bus according to one or more embodiments.

In operation S1210, the port analyzing unit 110 (FIG. 2) may analyze whether a port in which at least one component is connected with each other is a data transmission port or a function interface calling port in accordance with an application of the port.

In operation S1220, the execution attribute-determination unit 120 (FIG. 2) may determine an execution attribute of the port based on an analyzed result of the port analyzing unit 110 (FIG. 2).

In operation S1230, the port controller 130 (FIG. 2) may control the port in accordance with the execution attribute of the port.

The method for inter-connection between components according to the above-described example embodiments may be implemented by at least one processing device and/or recorded in computer-readable media including computer readable code, such as program instructions to implement various operations, e.g., by such as a processing device embodied by a computer. The media may also include, alone or in combination with the included program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

As described above, according to one or more embodiments, components may be connected with each other using the software bus, that is, a virtual bus structure, and a dynamic reconstruction function being adaptable to a change in the computing environment to be performed using provided connection attribute information may be provided.

Also, according to one or more embodiments, a virtual component assembly environment in which a component based system design is enabled may be provided, and a component RTE being suitable for the embedded computing environment may be provided.

Also, according to one or more embodiments, a component composition in an abstracted level on a virtual software bus may be enabled utilizing the software bus, thereby increasing a design productivity and recycle property of the system.

Also, according to one or more embodiments, a performance model being suitable for the embedded computing environment may be provided in the software bus, thereby providing a component RTE enabling a dynamic reconstruction while minimally using resources of the embedded system.

Also, according to one or more embodiments, a previously verified connection model of the components may be provided in the software bus, thereby increasing reliability of the system generated due to a complex component combination.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A system of inter-connection between components using a software bus, the system comprising:
    a port analyzing unit to analyze whether a port in which at least one component is connected is a data transmission port or a function interface calling port, wherein at least two components are connected with each other;
    an execution attribute-determination unit to determine an execution attribute of the port based on the analysis result of the port analyzing unit; and
    a port controller, using a computer, to control the port in accordance with the execution attribute of the port.

2. The system of claim 1, wherein the data transmission port includes a connection port between a sender and a receiver, and information is transmitted to the connection port of the receiver by a code automatically generated through a function of the sender and the receiver regardless of a processor assignment of the at least one component, the function being a sensing function or a receiving function.

3. The system of claim 2, wherein the data transmission port transmits the information in a normal type or a scalar type depending on a type of the information and whether the information is blocked when transmitting the information, the normal type includes any one of array data and a frame buffer, and the scalar type includes any one data type of byte, word, and long.

4. The system of claim 1, wherein the function interface calling port calls an interface between a requiring port of a client and a providing port of a server.

5. The system of claim 1, wherein the function interface calling port automatically generates a code in accordance with a processor assignment of the at least one component.

6. The system of claim 1, wherein the execution attribute-determination unit demarcates the function interface calling port into any one of a thread generation-connection port for each request using an attribute of an on-demand function calling port, and a recursive server connection port using an attribute of an on load function calling port in accordance with a type of the called port.

7. The system of claim 6, wherein the port controller performs a called function in a thread generated when a calling event of the on-demand function calling port occurs, and removes the generated thread after a performance of the called function is terminated.

8. The system of claim 6, wherein the port controller performs a called function in a thread generated when a calling of the on load function calling port is initially requested, and enables the generated thread to remain during a life-cycle to thereby perform the called function in the remaining thread when a calling of the function occurs.

9. The system of claim 6, wherein the port controller provides any one of a synchronous attribute and an asynchronous attribute with respect to the called port performing a called function, or provides any one of a thread safe attribute or a thread unsafe attribute.

10. The system of claim 9, wherein the port controller synchronizes a port of the thread unsafe attribute with a port of the thread safe attribute through the synchronous attribute when the thread safe attribute is requested from the port of the thread unsafe attribute.

11. The system of claim 6, wherein the port controller, in a case of the recursive server connection port, determines a thread generated in the recursive server connection port as any one type of a boss unit and at least one worker unit to thereby control a function to be performed in parallel.

12. The system of claim 11, wherein the port controller transmits a calling request for the function to the at least one worker unit through the boss unit, and the at least one worker unit performs the function of the calling request and transmits a result to a port having performed the calling request for the function.

13. The system of claim 11, wherein the boss unit controls any one of a idle request, a process request, and a receiving block request of the at least one worker unit to be performed.

14. The system of claim 11, wherein the port controller dynamically increases a number of the worker units when a number of the on load function increases.

15. The system of claim 1, wherein the at least one component includes information of a pointer for a function request, the pointer includes a function pointer, a function list, and a function factor information, and the execution attribute-determination unit determines the execution attribute of the port, the port using the pointer information.

16. The system of claim 4, wherein, when the requiring port is a software component and the providing port is a hardware component, a software adapter is connected with the providing port to enable the providing port to be connected with the requiring port.

17. A method for inter-connection between components using a software bus, the method comprising:
    analyzing whether a port in which at least one component is connected, is a data transmission port or a function interface calling port, wherein at least two components are connected with each other;
    determining an execution attribute of the port based on a result of the analyzing; and
    controlling, using a computer, the port in accordance with the execution attribute of the port.

18. The method of claim 17, wherein the determining demarcates the function interface calling port into any one of a thread generation-connection port for each request using an attribute of an on-demand function calling port, and a recursive server connection port using an attribute of an on load function calling port in accordance with a type of the called port.

19. The method of claim 18, wherein, in a case of the recursive server connection port, the controlling determines a thread generated in the recursive server connection port as any one type of a boss unit and at least one worker unit to thereby control a function to be performed in parallel.

20. A non-transitory computer-readable recording medium comprising computer readable code to control a computer to implement a method for inter-connection between components using a software bus, the method comprising:

analyzing whether a port in which at least one component is connected, is a data transmission port or a function interface calling port, wherein at least two components are connected with each other;

determining an execution attribute of the port based on a result of the analyzing; and controlling the port in accordance with the execution attribute of the port.

* * * * *